3,120,266
METHOD FOR REMOVAL OF OIL FROM WELLS
Theodore T. Martin and Billy V. Randall, Tulsa, Okla.,
assignors to Pan American Petroleum Corporation,
Tulsa, Okla., a corporation of Delaware
No Drawing. Filed June 30, 1960, Ser. No. 39,832
16 Claims. (Cl. 166—44)

The present invention relates to a method for removing oil from wells. More particularly, it is concerned with the problems involved when oil is present in a well during gas drilling, coring of low-pressure formations, well completions, work-over operations, and the like. In solving these problems we employ a class of silicon compounds as oil foaming agents. The discovery of this property, i.e., the ability of silicon compounds to foam petroleum, is considered indeed surprising inasmuch as the prior art has previously regarded these materials to serve as anti-foam agents, particularly in non-aqueous systems.

One of the principal problems in drilling a well using a gas as the circulating fluid is concerned with controlling the flow of formation liquids into the well. Due to the low bottom hole pressures that accompany gas drilling, water-bearing zones can produce into the well bore after the zone is penetrated by the drill. If a small quantity of water is produced, the wet shale cuttings, when agitated, become sticky and tend to adhere to one another, forming balls which, due to their size, are difficult to remove from the bottom of the hole. Wet shale also sticks to the formation wall, casing, or drill pipe, forming mud rings which build up during circulation. Both of these conditions can develop to a degree where cuttings and gas are impeded in their passage upward in the annulus. As a result, lost circulation, low penetration rate of the bit and stuck drill pipe can result. Entry of a small quantity of water into the well bore may be detected by a decrease or discontinuance of dust or an increase in the humidity of the exhaust gas.

This water is generally most effectively removed by the use of a suitable foaming agent and in this way impairment of the efficiency of the air drilling operation is prevented. Although the entry of formation liquids, consisting primarily of oil, into the well during air drilling operations does not occur too frequently—at least in amounts sufficient to cause difficulty with the drilling operation—serious disadvantages can arise resulting from the entry of oil into the well owing to the fact that the oil does not foam readily and, hence, cuttings cannot be removed easily. Of course, increased gas circulating pressures may be used up to a certain point, but eventually the hydrostatic head of the oil in the well becomes so great that either available compressor capacity cannot handle the problem or it is uneconomical to employ the compressor capacity required to do the job.

In the case of coring operations in low-pressure formations, well work-over jobs, well completion operations, etc., the well is usually full of oil. Normally, this condition requires a time-consuming and expensive swabbing operation to clean out the well before any of the above-mentioned procedures can be carried out.

Removal of oil from a well by bringing it up in the form of a foam has previously been recognized as a desirable procedure. However, such art merely suggested, in effect, an invitation to experiment. Materials such as various water-soluble gums, starch, commercial soaps, etc., have been proposed as agents for foaming oil out of wells, but in our work we have found them to be far from satisfactory, as the results hereinafter reported show.

Accordingly, it is an object of our invention to provide an inexpensive and efficient means for recovering oil standing in a well. It is a further object of our invention to provide a method for removing predominantly oil-containing formation liquids as they enter the well by foaming such liquids out of the well. It is a still further object to effect such oil removal operations by the use of a class of substantially non-polar compounds that have previously been used as foam breakers, particularly for non-aqueous systems.

We have now discovered, after screening some 2000 compounds, a class of materials capable of accomplishing the above-mentioned objects. These oil foaming agents belong to a class of silicon derivatives known as silicones, and have the following general structural formula:

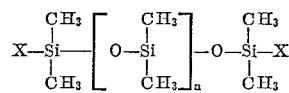

wherein X represents methyl, aryl and

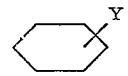

in which Y may be halogen, or a lower alkyl group, and $n$ is a number ranging from about 20 to about 70. With $n$ values of this order, the molecular weights of these materials range from about 1500 to about 5000. Such compounds generally have a viscosity of from about 10 to about 60 centistokes (cstks.), although polymers with viscosities ranging from about 3 to 100 cstks., may be used.

As examples of these compounds there may be mentioned the dimethyl polysiloxanes, $\alpha,\omega$-diphenyl dimethyl siloxanes, such as

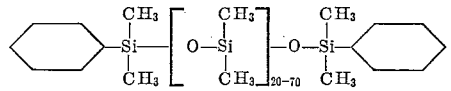

the $\alpha,\omega$-dichlorophenyl dimethyl siloxanes, such as

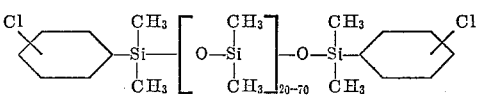

and $\alpha,\omega$-diethylphenyl dimethyl siloxanes such as

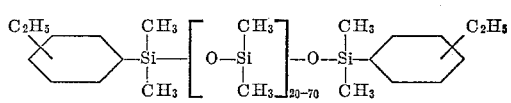

A number of methods are available for making these compounds, some of which are described in Chemistry of the Silicones, 2nd ed., by E. G. Rochow, published by John Wiley and Sons, Inc., pp. 78 to 82.

Silicones of the above-mentioned type find use in a number of processes in which it is desired to remove petroleum either from a surface or from a cavity such as a well. The concentration of silicones used to obtain the desired results will be found to vary with a number of factors. Thus, the particular application under consideration, the viscosity of the silicone, the amount of oil to be removed, and the manner in which the silicone is applied or introduced are all factors to be evaluated. Generally speaking, however, we usually prefer to use these compounds in concentrations of from 0.02 to about 5.0 weight percent based on the oil present. Higher percentages of silicone may be used if desired but ordinarily are unnecessary to produce suitable results. As will be pointed out below, however, the amount of foaming agent needed to remove the oil satisfactorily generally increases with increasing water content. Systems containing in excess of about 40 percent water exhibit considerable resistance to removal in this manner.

Silicones of the type contemplated by our invention can be employed in clean-out operations carried out in the open or uncased portion of an oil well. In the operation of a well, heavy hydrocarbon residues tend to collect at the face of the formation and to materially reduce the permeability thereof. In circumstances of this sort, we employ, for example, a silicone such as an $\alpha,\omega$-dichlorophenyl siloxane, having a viscosity of the order of about 60 cstks., in a concentration of .35 pound per barrel of diesel oil or kerosene. This solution is then injected into the well at the rate of about 7 barrels per hour with 1200 c.f.m. of natural gas. This treatment removes the heavy hydrocarbon deposits from the formation face and restores the permeability of the producing zone to a satisfactory level. The kerosene or diesel oil left in the well can be removed by ordinary producing methods or merely by injecting natural gas or an inert gas at a rate of from about 400 to about 1600 cubic feet per minute.

Similarly, in the case of a gas well that periodically becomes loaded with distillate resulting in decreased gas production, the well can be cleaned out by the use of oil foamers of the type mentioned above. For example, from about 2 to 10 pounds of silicone diluted to 1 pound per gallon with a medium boiling range hydrocarbon solvent such as kerosene, may be lubricated into the tubing or siphon string. The silicone can then be forced to the bottom of the well by introducing natural gas and equalizing the pressure between the tubing and siphon string. After the well has been closed in for 3 to 5 hours, or as long as is required to build up suitable pressure, e.g., 0.35 to about .4 p.s.i. per foot of well depth, it can be opened and the flow line directed to a pit or separator to get maximum pressure drop and the necessary amount of foaming to bring the distillate out of the well.

In application of our invention to gas drilling operations, gas and foamed oil are used as the circulating fluid. The use of gas permits maximum drilling or coring rate, prevents contamination of the producing zone and cores and allows for maximum inflow of formation fluid because of the complete absence of water and very low back pressure on the producing zone. In connection with coring or gas drilling operations, the silicone in a concentration of about .35 pound per barrel of kerosene is injected into the input gas. The gas circulation rate should be sufficient to give an annular velocity of 3000 feet per minute, and the silicone solution should be injected rapidly enough to remove cuttings and give minimum circulating pressure. The rate at which the silicone solution is injected into the well should normally be in the range of 5 to 10 barrels per hour.

Oil foaming agents of the type referred to above have been compared with many different kinds of oil foaming materials, including other silicon-containing compounds. In carrying out these tests, an apparatus was used of the type described in copending application Serial No. 733,863, filed May 8, 1958, by James L. Lummus and Billy V. Randall and now abandoned. Briefly, this equipment consisted of a Lucite column 10 feet high, 2½ inches I.D., and having concentrically placed therein a stainless steel tube about ¾ inch O.D. This tube is preferably cut to stand approximately ¼ inch from the bottom of the Lucite column. The column is preferably graduated, and has a removable plug at the bottom for cleaning purposes and a plug at the top through which fluids enter. At a point near the top of the column, there is a foam discharge pipe. Gas in measured quantities is introduced into the stainless steel tube. When tests are carried out in the presence of bit cuttings, a screen is located about 2 inches from the base of the column to hold the cuttings. Under simulated gas drilling conditions with foam, the cuttings are removed from the screen and the cuttings-carrying capacity of the foaming agent under investigation can thus be determined.

A preferred method of using this apparatus in testing foaming agents involves first making up about 1 liter of the oil foamer dissolved in kerosene, crude oil, or the like, depending on the nature of the specific test. The test is effected by introducing an inert gas, typically at the rate of about 2 cubic feet per minute, for a period of about 10 minutes. The majority of the tests reported here were carried out at a temperature of about 40° F. The foam produced during this test period is discharged into a reservoir, or reservoirs of known volume, for example 1 or more liter beakers, and the foam volume estimated. After setting for a short period, the foam is observed to break and the volume of liquid remaining is recorded. The quantity of hydrocarbon liquid measured in this manner is an indication of the oil-carrying capacity of the particular foaming agent investigated.

In tests reported immediately below, a number of silicon-type polymers were investigated. The apparatus used was of the type referred to immediately above. Foaming agent in the concentration listed below was dissolved in about 1 liter of diesel oil.

*Table I*

| Compound | Viscosity, cstks. | Concentration of Foaming Agent, Wt. Percent, Based on Oil | Foam Height, Inches | Fluid Removed, Vol., cc. |
| --- | --- | --- | --- | --- |
| $\alpha,\omega$-Dichlorophenyl dimethyl siloxane polymer. | 60 | 1 | [1] Over | 560 |
| Do | 60 | 0.02 | [1] Over | 42 |
| Do | 30 | 0.04 | [2] 30 | None. |
| Dimethyl diethoxy-silane | | 0.1 | 18 | None. |
| Dimethyl diethoxy-silane + NaOH. | | 0.2 | 18 | None. |
| Methyl triethoxy-silane + NaOH. | | 0.2 | 36 | None. |
| $\alpha,\omega$-Diphenyl dimethyl siloxane polymer. | 20 | 0.1 | Over | 260 |
| $\alpha,\omega$-Dimethyl dimethyl siloxane polymer. | 5 | 0.1 | 30 | None. |
| Do | 10 | 0.1 | Over | 230 |
| Do | 20 | 0.1 | Over | 300 |
| Do | 50 | 0.1 | Over | 100 |
| Do | 100 | 0.1 | 30 | None. |
| Cornstarch | | 0.25 (no water) | 24 | None. |
| Do | | 0.1 (in water) | 33 | None. |
| Gum Tragacanth | | 0.25 | 50 | None. |
| Higher alkyl phenoxy poly oxyethylene ethanol. | | 0.2 | 48 | None. |
| Di-n-alkyl dimethyl ammonium chloride. | | 0.5 | 12 | None. |

[1] Reached collecting line at top of column and came over.
[2] Very heavy foam.

From the above table, it will be noted that certain of the silicon-containing compounds failed completely to force the diesel oil out of the apparatus in the form of a foam. In every instance, however, in which foaming agents of the type covered by the present invention were tested in proper concentration, foam was not only produced from the apparatus, but diesel oil in substantial volumes was obtained during the 10-minute test period.

Likewise, it will be observed that prior art oil foaming agents, such as cornstarch, gum tragacanth and non-ionic surface active agents were practical failures even when employed in substantial concentrations. The effect of viscosity, or the degree of polymerization on the efficiency of our novel oil foaming agents is seen by reference to the above table in which the α,ω-dimethyl dimethyl siloxane polymer was used. This particular polymer was employed in grades varying in viscosity of from 5 to 100 cstks. It is clear from the information recorded in the above table with respect to such compounds that peak foam formation and oil removal efficiencies are obtained with viscosities lying in the range of from 10 to about 50 cstks.

Table II demonstrates the effect of water and foaming agent concentration on the efficiency of oil removal.

*Table II*

| Compounds | Concentration of Foaming Agent, Wt. Percent Based on Oil | Water, Wt. Percent Based on Oil | Fluid Removed, Volume cc. |
|---|---|---|---|
| α,ω-diphenyl dimethyl siloxane polymer | .10 | 0.0 | 462 |
| Do | .03 | 0.0 | 188 |
| Do | .10 | 1.0 | 372 |
| Do | .10 | 10.0 | 386 |
| Do | .02 | 1.0 | 112 |
| Do | .02 | 10.0 | 0 |
| Do | .05 | 10.0 | 98 |
| α,ω-dichlorophenyl dimethyl siloxane polymer | .10 | 0.0 | 406 |
| Do | .02 | 0.0 | 167 |
| Do | .10 | 10.0 | 343 |
| Do | .02 | 10.0 | 133 |
| α,ω-dimethyl dimethyl siloxane polymer | .10 | 0.0 | 286 |
| Do | .02 | 0.0 | 167 |
| Do | .10 | 1.0 | 286 |
| Do | .10 | 10.0 | 337 |
| Do | .02 | 10.0 | 92 |

In still a third series of tests carried out essentially under circumstances similar to those described above, crude oils from the Midland Farms and Spindletop, Texas, fields were investigated to test the ability of various oil foamers to remove crudes of these types from a simulated well.

*Table III*

| Compound | Concentration of Foaming Agent, Wt. Percent Based on Oil | Fluid Removed, Volume cc. | Crude Oil |
|---|---|---|---|
| None | | 12″ of foam | Midland Farms. |
| α,ω-Dichlorophenyl dimethyl siloxane polymer | 0.1 | 75 cc | Do. |
| Do | 0.2 | 240 cc | Do. |
| Do | 0.3 | 420 cc | Do. |
| α,ω-Diphenyl dimethyl siloxane polymer | 0.1 | 200 cc | Do. |
| α,ω-Dimethyl dimethyl siloxane polymer | 0.02 | 10 cc | Do. |
| Do | 0.1 | 125 cc | Do. |
| None | | No foam at all. | Spindletop. |
| α,ω-Dichlorophenyl dimethyl siloxane polymer [1] | 0.2 | 6″ of foam | Do. |
| Do.[1] | 0.3 | 12″ of foam. | Do. |

[1] Samples foamed copiously when diluted with diesel fuel.

In similar tests in which cuttings were introduced into the apparatus and the foaming agent employed in a concentration of .35 pound per barrel of diesel oil, it was found that under simulated well conditions from 60 to 180 pounds of cuttings per hour could be removed from the well using gas rates producing annular velocities of about 3000 feet per minute. With respect to cuttings-carrying capacity, it appeared that polymers having a viscosity of the order of 20 cstks. were superior to those having viscosities of the order of 50 cstks.

The term "gas," as used in the present description and claims, is intended to refer to gases which are inert under the conditions of use such as, for example, natural gas or nitrogen, which may be supplied by a conventional inert gas generator. Obviously, air might also be used, so long as combustible mixtures of air and hydrocarbon vapors are avoided. As a practical matter, the avoidance of such mixtures may be difficult.

We claim:

1. In a process of removing liquid petroleum from a well penetrating a petroleum-containing reservoir by converting said petroleum into a foam, the improvement which comprises incorporating into said petroleum a silicone polymer dissolved in a hydrocarbon solvent selected from the group consisting of diesel oil and kerosene, said polymer having the following general symmetrical structural formula:

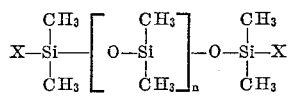

wherein X is a member selected from a group consisting of methyl, aryl, alkaryl in which the alkyl group has no more than 2 carbon atoms, and

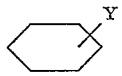

wherein Y is a halogen atom, and n is a number ranging from about 20 to about 70; and introducing a gas into the resulting solution of said polymer and liquid petroleum at a rate sufficient to form a liquid petroleum foam and to force the latter up and out of said well.

2. The process of claim 1 in which the silicone polymer has the following general symmetrical structural formula:

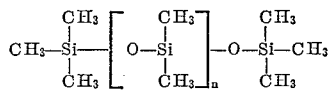

in which n is a number ranging from about 20 to about 70.

3. The process of claim 1 in which the silicone polymer has the following general symmetrical structural formula:

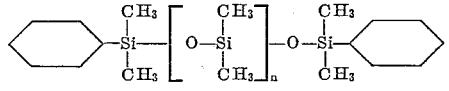

in which n is a number ranging from about 20 to about 70.

4. The process of claim 1 in which the silicone polymer has the following general symmetrical structural formula:

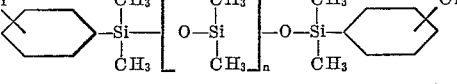

in which n is a number ranging from about 20 to about 70.

5. The process of claim 1 in which the silicone polymer has the following general symmetrical structural formula:

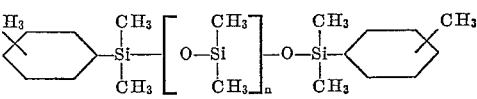

in which n is a number ranging from about 20 to about 70.

6. The process of claim 1 in which said polymer is employed in an amount ranging from about 0.02 to about 5.0 weight percent, based on the liquid petroleum in said well, said polymer having a viscosity of from about 10 to about 60 centistokes.

7. The process of claim 6 in which the water content of the fluids in said well does not exceed about 40 percent, based on the weight of the liquid petroleum.

8. The process of claim 6 in which the water content of the fluids in said well does not exceed about 40 percent, based on the weight of the liquid petroleum, and the silicone polymer employed has the following general symmetrical structural formula:

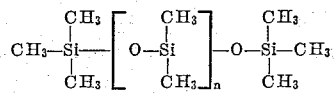

in which $n$ is a number ranging from about 20 to about 70.

9. The process of claim 6 in which the water content of the fluids in said well does not exceed about 40 percent, based on the weight of the liquid petroleum, and the silicone polymer employed has the following general symmetrical structural formula:

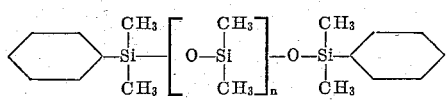

in which $n$ is a number ranging from about 20 to about 70.

10. The process of claim 6 in which the water content of the fluids in said well does not exceed about 40 percent, based on the weight of the liquid petroleum, and the silicone polymer employed has the following general symmetrical structural formula:

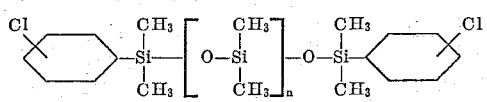

in which $n$ is a number ranging from about 20 to about 70.

11. In a process for working-over the open hole section of a well penetrating an oil producing zone located in said open-hole section, the improvement which comprises adding to said well a solution of a silicone polymer dissolved in a hydrocarbon solvent selected from the group consisting of diesel oil and kerosene, said polymer being present in a concentration of from about .25 to about 15 pounds per barrel of the solvent employed and having the following general symmetrical structural formula:

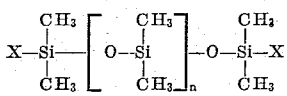

wherein X is a member selected from a group consisting of methyl, aryl, alkaryl, in which the alkyl group has no more than 2 carbon atoms, and

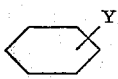

wherein Y is a halogen atom, and $n$ is a number ranging from about 20 to about 70; and introducing a gas into the liquid contents of the well to form an oil foam, and forcing the latter out of said well.

12. The process of claim 11 in which the silicone polymer is α,ω-diphenyl dimethyl siloxane.

13. The process of claim 11 in which the silicone polymer is α,ω-dimethyl dimethyl siloxane.

14. The process of claim 11 in which the silicone polymer is α,ω-dichlorophenyl dimethyl siloxane.

15. In a process of removing liquid petroleum from a well penetrating a petroleum-containing reservoir by converting said petroleum into a foam, the improvement which comprises incorporating into said petroleum, prior to removal thereof from said well, a silicone polymer dissolved in a hydrocarbon solvent selected from the group consisting of diesel oil and kerosene, said polymer having the following general symmetrical structural formula:

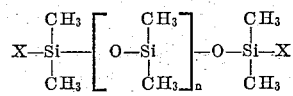

wherein X is a member selected from a group consisting of methyl, aryl, alkaryl in which the alkyl group has no more than 2 carbon atoms, and

wherein Y is a halogen atom, and $n$ is a number sufficient in size to give a polymer having a viscosity ranging from about 3 to about 100 centistokes; introducing a gas into the liquid contents of the well to form a liquid petroleum foam, and producing the latter out of said well.

16. In a process of removing liquid petroleum from a surface the improvement which comprises contacting said surface in the presence of agitation with a gas with a silicone polymer having the following general structural formula:

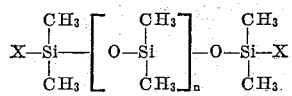

wherein X is a member selected from a group consisting of methyl, aryl, alkaryl in which the alkyl group has no more than 2 carbon atoms, and

wherein Y is a halogen atom, and $n$ is a number ranging from about 20 to about 70, whereby said petroleum is converted into a foam, and removing said foam from said surface.

References Cited in the file of this patent

UNITED STATES PATENTS

| | | |
|---|---|---|
| 2,168,116 | Crites et al. | Aug. 1, 1939 |
| 2,614,635 | Williams et al. | Oct. 21, 1952 |

OTHER REFERENCES

McGregor: Silicones and their Uses, 1954, by McGraw-Hill of New York, page 74.